US011895462B2

(12) United States Patent
Kanamori

(10) Patent No.: US 11,895,462 B2
(45) Date of Patent: Feb. 6, 2024

(54) MICROPHONE DEVICE INCLUDING A BAFFLE ON WHICH TWO OR MORE MICROPHONE ELEMENTS ARE DISPOSED

(71) Applicant: Panasonic Intellectual Property Corporation of America, Torrance, CA (US)

(72) Inventor: Takeo Kanamori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 320 days.

(21) Appl. No.: 17/365,303

(22) Filed: Jul. 1, 2021

(65) Prior Publication Data

US 2021/0329374 A1 Oct. 21, 2021

Related U.S. Application Data

(63) Continuation of application No. PCT/JP2020/005425, filed on Feb. 13, 2020.

(60) Provisional application No. 62/805,551, filed on Feb. 14, 2019.

(51) Int. Cl.
*H04R 1/40* (2006.01)
*H04R 3/00* (2006.01)

(52) U.S. Cl.
CPC ............. *H04R 1/406* (2013.01); *H04R 3/005* (2013.01)

(58) Field of Classification Search
CPC . H04R 1/40; H04R 1/406; H04R 3/00; H04R 3/005
USPC .................................. 381/92, 355, 356, 359
See application file for complete search history.

(56) References Cited

U.S. PATENT DOCUMENTS

2010/0278357 A1* 11/2010 Hiroe .................. G10L 21/0272 381/111
2011/0164761 A1* 7/2011 McCowan ............. H04R 3/005 381/92

FOREIGN PATENT DOCUMENTS

JP 2-222400 9/1990
JP 2019-29796 2/2019

OTHER PUBLICATIONS

International Search Report (ISR) dated Apr. 7, 2020 in International (PCT) Application No. PCT/JP2020/005425.

* cited by examiner

*Primary Examiner* — Harry S Hong
(74) *Attorney, Agent, or Firm* — Wenderoth, Lind & Ponack, L.L.P.

(57) ABSTRACT

A microphone device according to the present disclosure includes: two or more microphone elements for picking up sounds which are disposed in spatially different locations; a baffle that has a surface on which the two or more microphone elements are disposed, and interferes with, among the sounds, a passage of a sound other than a direct sound that travels from a frontal direction in which the two or more microphone elements face and directly reaches the two or more microphone elements; and a directionality synthesizer that produces a directionality synthesized signal by performing directionality synthesis on output signals outputted by the two or more microphone elements.

7 Claims, 8 Drawing Sheets

MICROPHONE DEVICE INCLUDING A BAFFLE ON WHICH TWO OR MORE MICROPHONE ELEMENTS ARE DISPOSED

CROSS REFERENCE TO RELATED APPLICATIONS

This is a continuation application of PCT International Application No. PCT/JP2020/005425 filed on Feb. 13, 2020, designating the United States of America, which is based on and claims priority of U.S. Provisional Patent Application No. 62/805,551 filed on Feb. 14, 2019. The entire disclosures of the above-identified applications, including the specifications, drawings and claims are incorporated herein by reference in their entirety.

FIELD

The present disclosure relates to a microphone device.

BACKGROUND

For example, Patent Literature (PTL) 1 proposes the directional microphone that accurately suppresses sensitivity in a predetermined direction in various frequency bands.

CITATION LIST

Patent Literature

PTL 1: Japanese Unexamined Patent Application Publication No. 2019-29796

SUMMARY

Technical Problem

However, the directional microphone disclosed in PTL 1 includes a line microphone such that the directional microphone has narrow forward directionality. Since a line microphone includes a number of microphone elements and thus occupies a certain volume of a microphone, it is difficult to downsize the directional microphone disclosed in PTL 1.

For a microphone device such as a directional microphone, the implementation of, in various frequency bands, a directional pattern having uniform sensitivity and sensitivity in a narrow range is sought after. However, if a microphone device is downsized by reducing the number of microphone elements etc., a grating lobe affects the directional pattern in a high frequency band, and a range of a blind spot in sensitivity increases in a low frequency band. For these reasons, the directional pattern having uniform sensitivity and sensitivity in a narrow range in various frequency bands has yet to be implemented. Accordingly, implementing the directional pattern having uniform sensitivity and sensitivity in a narrow range in various frequency bands with a downsized microphone device requires narrowing of directionality of a directional pattern and creating of the directional pattern having the narrowed directionality in various frequency bands.

The present disclosure has been conceived in view of the above, and aims to provide a microphone device that can implement narrowing of directionality of a directional pattern and creating of the directional pattern having the narrowed directionality in various frequency bands, even if the microphone device is downsized.

Solution to Problem

In order to provide such a microphone device, a microphone device according to an embodiment of the present disclosure includes: two or more microphone elements for picking up sounds which are disposed in spatially different locations; a baffle that has a surface on which the two or more microphone elements are disposed, and interferes with, among the sounds, a passage of a sound other than a direct sound that travels from a frontal direction in which the two or more microphone elements face and directly reaches the two or more microphone elements; and a directionality synthesizer that produces a directionality synthesized signal by performing directionality synthesis on output signals outputted by the two or more microphone elements.

Note that some specific aspects among the above-described aspects may be implemented using a system, a method, an integrated circuit, a computer program, a computer-readable recording medium such as a CD-ROM, and any optional combination of systems, methods, integrated circuits, computer programs, and computer-readable recording media.

Advantageous Effects

A microphone device according to the present disclosure can implement narrowing of directionality of a directional pattern and creating of the directional pattern having the narrowed directionality in various frequency bands, even if the microphone device is downsized.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
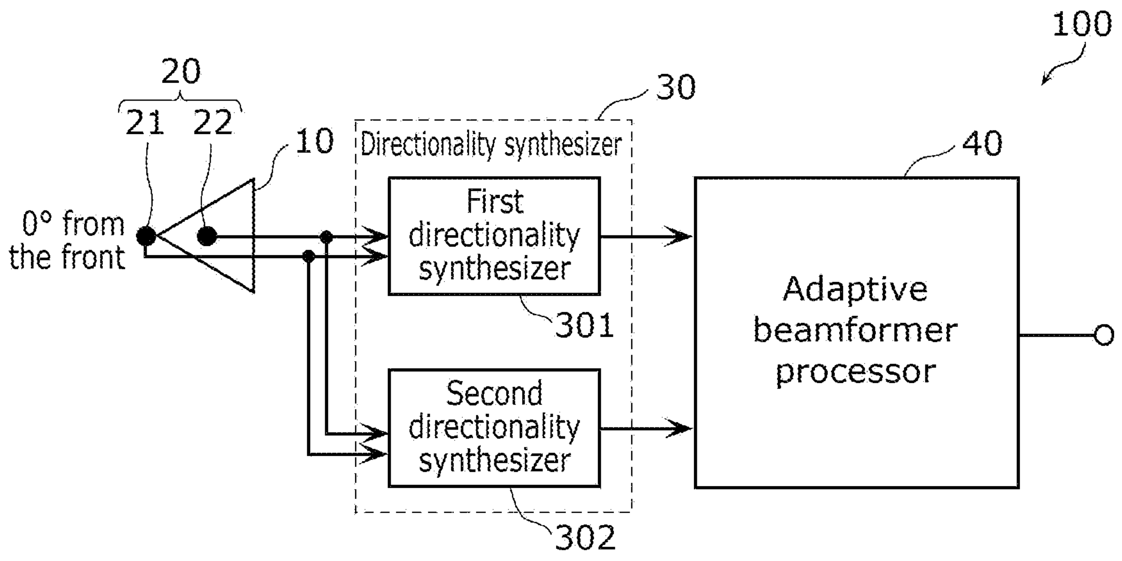
FIG. 1 is a diagram illustrating an example of a configuration of a microphone device according to an embodiment.

DESCRIPTION OF EMBODIMENT (Underlying Knowledge Forming Basis of the Present Disclosure)

Since implementation of the directional pattern having uniform sensitivity and sensitivity in a narrow range in a various frequency bands with a microphone device such as a directional microphone is sought after even if the microphone device is downsized, it requires narrowing of directionality of a directional pattern and creating of the directional pattern having the narrowed directionality in various frequency bands.

However, PTL 1 does not refer to the downsizing of a line microphone in the disclosure of the directional microphone, and since the line microphone includes a number of microphone elements and thus occupies a certain volume of a microphone, it is difficult to downsize the directional microphone.

In addition, in the case of downsizing a microphone array such as a line microphone by, for example, reducing the number of microphone elements, the following problem is also anticipated. For example, since the wavelength of an acoustic wave is long in a low frequency band of 100 Hz to 200 Hz, it is difficult to produce directionality using a small microphone array which is about 1 cm to 10 cm in size. On the contrary, the wavelength of an acoustic wave is short in a high frequency band, and thus microphone elements in a microphone array need to be narrowly spaced apart from each other. Accordingly, an increase in the number of microphone elements is likely to solve the problem of producing directionality.

Accordingly, a microphone device according to an aspect of the present disclosure includes: two or more microphone elements for picking up sounds which are disposed in spatially different locations; a baffle that has a surface on which the two or more microphone elements are disposed, and interferes with, among the sounds, a passage of a sound other than a direct sound that travels from a frontal direction in which the two or more microphone elements face and directly reaches the two or more microphone elements; and a directionality synthesizer that produces a directionality synthesized signal by performing directionality synthesis on output signals outputted by the two or more microphone elements.

In this way, a baffle included in the microphone device allows an acoustic wave traveling from the frontal direction from which a sound desired to be picked up travels to directly reach each of microphone elements, even if a microphone device includes a small number of microphone elements such as two or four microphone elements, for example. The baffle, on the contrary, reflects off or diffracts an acoustic wave traveling from a direction which is other than the frontal direction and from which a sound desired to be attenuated travels so as to allow the acoustic wave to indirectly reach each of the microphone elements to increase a phase difference between the microphone elements and to produce a sound pressure difference between the microphone elements. This results in an improvement in directionality having a blind spot in sensitivity in the frontal direction, thereby implementing narrowing of directionality of a directional pattern of a signal on which processing, such as adaptive beamformer processing, is performed, and creating of the directional pattern of the signal in various frequency bands.

With this, it is possible to provide a microphone device that can implement narrowing of directionality of a directional pattern and creating of the directional pattern having the narrowed directionality in various frequency bands, even if the microphone device is downsized.

Here, the baffle is in a shape of, for example, a cone, and one microphone element among the two or more microphone elements is disposed at the vertex of the cone. The baffle is disposed such that the vertex of the cone is oriented toward a front toward which the two or more microphone elements face.

In addition, the surface of the baffle includes, for example, (i) an upper part which is a region on which the two or more microphone elements are disposed, and (ii) a lower part which is a base region on which the two or more microphone elements are not disposed.

With this, it is possible to reduce the extent of a dip in the directional pattern.

In addition, for example, the directionality synthesizer produces, by performing directionality synthesis on output signals outputted by the two or more microphone elements, (i) a directionality synthesized signal having sensitivity in the frontal direction; and (ii) a directionality synthesized signal having a blind spot in sensitivity in the frontal direction.

In addition, for example, the two or more microphone elements include at least two and at most 16 microphone elements.

With this, it is possible to downsize a microphone device since the microphone device includes a small number of microphone elements.

Note that some specific aspects among the above-described aspects may be implemented using a system, a method, an integrated circuit, a computer program, a computer-readable recording medium such as a CD-ROM, or any optional combination of systems, methods, integrated circuits, computer programs, or computer-readable recording media.

Hereinafter, a microphone device according to an aspect of the present disclosure will be described in detail with reference to the drawings. Note that embodiments described below each describe a specific example of the present invention. The numerical values, shapes, materials, structural elements, the arrangement of the structural elements, etc. presented in the embodiments below are mere examples and do not limit the present invention. Furthermore, among the structural elements in the embodiments below, those not recited in any one of the independent claims representing the most generic concepts will be described as optional structural elements. Moreover, the embodiments may be combined.

Embodiment

[Overall Configuration of Microphone Device 100]

Figure 2:
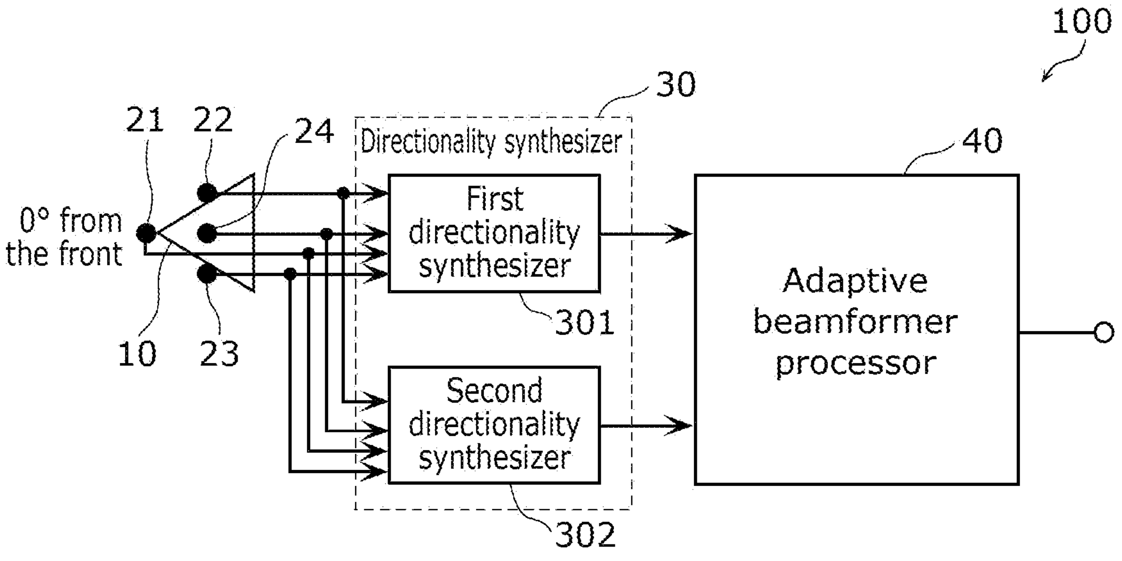
FIG. 2 is a diagram illustrating another example of a configuration of the microphone device according to the embodiment.

FIG. 1 is a diagram illustrating an example of a configuration of microphone device 100 according to an embodiment. FIG. 2 is a diagram illustrating another example of a configuration of microphone device 100 according to the embodiment.

Microphone device 100 can implement, even if microphone device 100 includes a small number of microphones and thus is downsized, narrowing of directionality of a directional pattern and creating of the directional pattern having the narrowed directionality in various frequency bands using a small number of microphones. In this embodiment, microphone device 100 includes, as illustrated in FIG. 1, baffle 10, microphone array 20, directionality synthesizer 30, and adaptive beamformer processor 40. Note that it is not essential that microphone device 100 includes adaptive beamformer processor 40. Hereinafter, each of these structural elements will be described in detail.

[Microphone Array 20]

Microphone array 20 includes two or more microphone elements for picking up sounds. The two or more microphone elements are disposed in spatially different locations. For example, microphone array 20 may include, as illustrated in FIG. 1, two microphone elements 21 and 22, or may include, as illustrated in FIG. 2, four microphone elements 21, 22, 23, and 24. Note that the number of the two or more microphone elements included in microphone array 20 is not limited to two or four. The number of the two or more microphone elements is to be at least two and at most 10.

In this embodiment, microphone elements 21, 22, 23, and 24 each have a directional pattern that is omnidirectional and has high sensitivity with respect to sound pressure. A disposition of microphone elements 21 to 24 will be described later.

[Baffle 10]

Baffle 10 has a surface on which the two or more microphone elements are disposed. Among sounds, baffle 10 interferes with a passage of a sound other than a direct sound that travels from the frontal direction and directly reaches the two or more microphone elements. Here, baffle 10 is formed such that a sound is prevented from transmitting through the inside of baffle 10. Baffle 10 interferes with a passage of the sound by diffracting the sound by its surface, or by reflecting the sound off its surface. Baffle 10 may include a material, such as resin, an aerated material, wood, or iron. Baffle 10 may include a porous material so long as baffle 10 can prevent the sound from transmitting through the inside of baffle 10.

Figure 4:
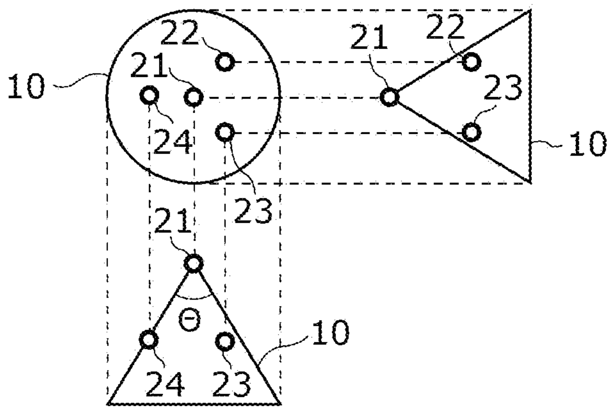
FIG. 4 is a diagram illustrating an example of a disposition of four microphone elements on the surface of the baffle in the shape of a circular cone according to the embodiment.

In addition, baffle 10 is in the shape of a cone, for example. In this case, one of the two or more microphone elements is disposed at the vertex of the cone. In addition, baffle 10 is disposed such that the vertex is oriented toward a front toward which the two or more microphone elements face. For example, in this embodiment, as illustrated in FIG. 2 and FIG. 4, baffle 10 is disposed such that the vertex of baffle 10 is oriented toward 0° from the front of microphone array 20, and the bottom face of baffle 10 is oriented toward the rear (180° from the front) of microphone array 20. Note that the shape of a cone is not limited to a circular cone as illustrated in FIG. 2 and FIG. 4. The shape of a cone may be a triangular pyramid or a square pyramid.

Here, examples of a disposition of the two or more microphone elements on the surface of baffle 10 in the shape of a circular cone will be described with reference to the drawings.

Figure 3:
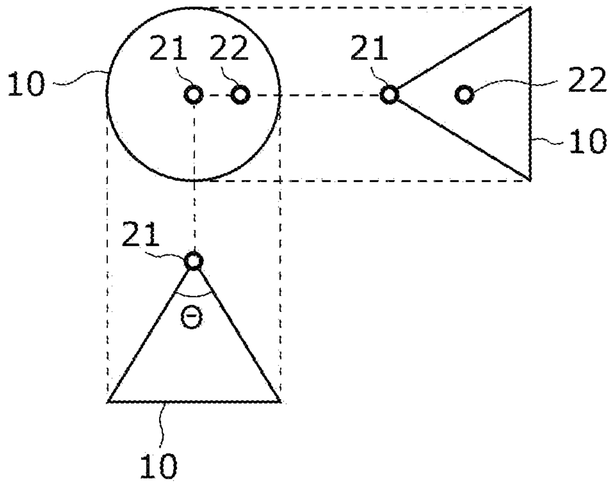
FIG. 3 is a diagram illustrating an example of a disposition of two microphone elements on a surface of a baffle in the shape of a circular cone according to the embodiment.

FIG. 3 is a diagram illustrating an example of a disposition of two microphone elements 21 and 22 on a surface of baffle 10 in the shape of a circular cone according to the embodiment.

In the example illustrated in FIG. 3, baffle 10 is in the shape of a circular cone. Vertical angle Θ is to be about 30° to 60°, considering an angular range of a blind spot in sensitivity of directionality of a directionality synthesized signal, which is obtained by performing directionality synthesis on output signals outputted by the two or more microphone elements. The directionality (hereinafter referred to as reference directionality) has a blind spot in sensitivity in the frontal direction. Note that in the example illustrated in FIG. 3, the size of baffle 10 is, for example, about 7 cm to 8 cm in distance from the vertex to the bottom face, and the radius of the bottom face is 5 cm to 6 cm. However, the size of baffle 10 is not limited to the above example. The size of baffle 10 is to be about at most 10 cm.

In addition, in the example illustrated in FIG. 3, microphone element 21, which is one of the two microphone elements 21 and 22, is disposed at the vertex of baffle 10, and microphone element 22, which is the other of the two microphone elements, is disposed at a location on the surface of baffle 10, between the vertex and the bottom face. Note that so long as microphone element 22 is disposed at a location on the surface of baffle 10 between the vertex and the bottom face, a location of microphone element 22 is not limited to the location as illustrated in FIG. 3.

FIG. 4 is a diagram illustrating an example of a disposition of four microphone elements 21, 22, 23, and 24 on the surface of baffle 10 in the shape of a circular cone according to the embodiment.

In the example illustrated in FIG. 4, baffle 10 is in the shape of a circular cone, and vertical angle Θ of the circular cone is about 30° to 60°, as presented in the example illustrated in FIG. 3. In addition, the size of baffle 10 is as described in the example illustrated in FIG. 3.

In addition, microphone element 21, which is one of the four microphone elements 21, 22, 23, and 24, is disposed at the vertex of baffle 10, and microphone elements 22, 23, and 24, which are the rest of the four microphone elements, are disposed at locations on the surface of baffle 10, between the vertex and the bottom face. In the example illustrated in FIG. 4, microphone elements 22, 23, and 24 are disposed such that the vertex serves as the center of symmetry. In other words, in a top view of baffle 10, microphone elements 22, 23, and 24 are disposed a fixed distance away from the vertex and are disposed at regular intervals. Note that so long as microphone elements 22, 23, and 24 are disposed at locations on the surface of baffle 10 between the vertex and the bottom face, locations of microphone elements 22, 23, and 24 are not limited to the locations as illustrated in FIG. 4.

Figure 5:
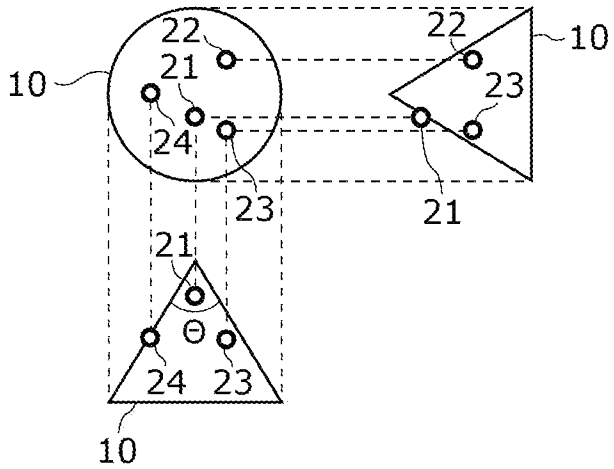
FIG. 5 is a diagram illustrating another example of a disposition of the four microphone elements on the surface of the baffle in the shape of a circular cone according to the embodiment.

FIG. 5 is a diagram illustrating another example of a disposition of the four microphone elements 21, 22, 23, and 24 on the surface of baffle 10 in the shape of a circular cone according to the embodiment. FIG. 5 illustrates a disposition of the four microphone elements 21, 22, 23, and 24 different from the disposition of the four microphone elements 21, 22, 23, and 24 illustrated in FIG. 4. That is, microphone elements 22, 23, and 24 are disposed such that the vertex does not serve as the center of symmetry. Microphone elements 22, 23, and 24 are disposed at locations on the surface of baffle 10 between the vertex and the bottom face. In addition, microphone elements 22, 23, and 24 are disposed the same distance away from the bottom face, and are disposed at regular intervals. However, in a top view of baffle 10, a distance between the vertex and each of microphone elements 22, 23, and 24 may be different. With this, it is possible to reduce the extent of a dip in the reference directional pattern which will be described later.

Note that the size of baffle 10 need not be at most about 10 cm, so long as baffle 10 in the shape of a circular cone has at least two microphone elements disposed within an area of at most 10 cm from the vertex. An example illustrating the above case will be described with reference to FIG. 5.

Figure 6:
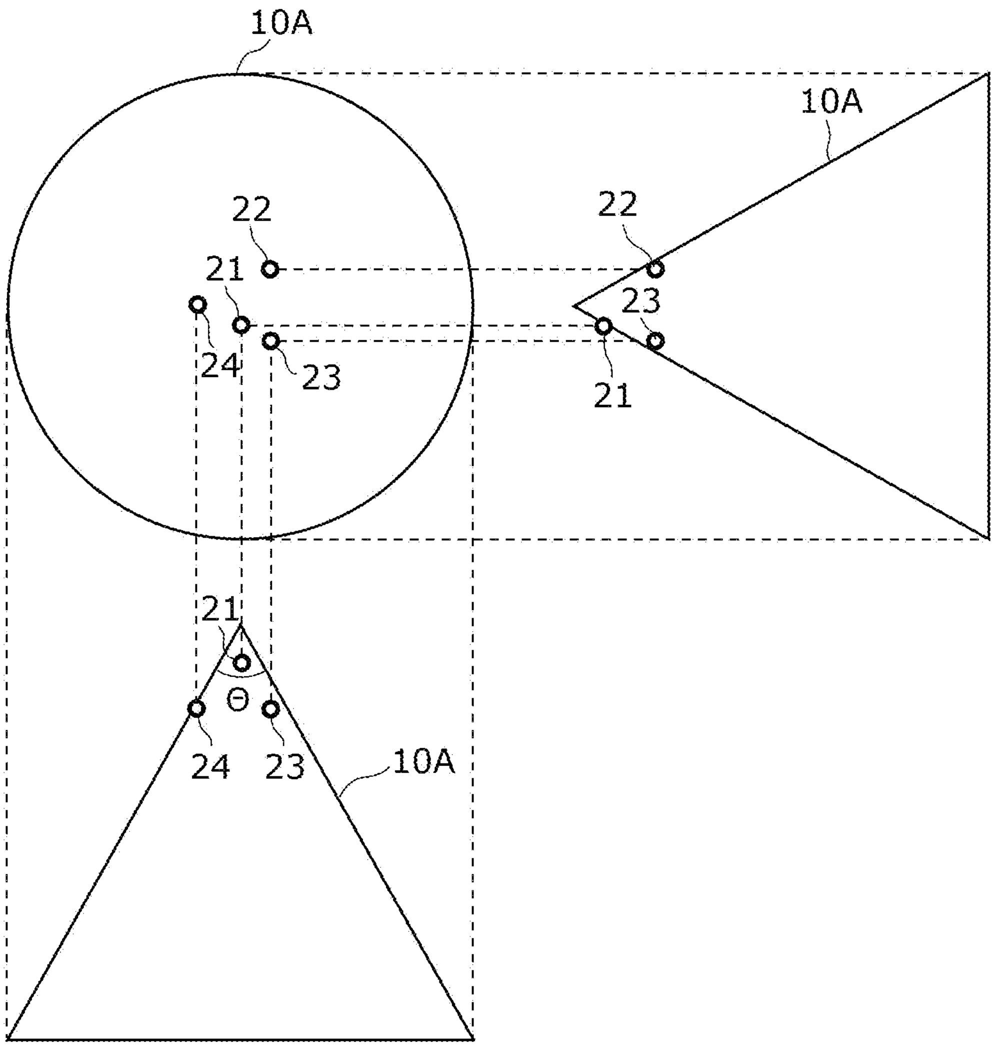
FIG. 6 is a diagram illustrating another example of a disposition of the four microphone elements on a surface of a baffle in the shape of a circular cone according to the embodiment.

FIG. 6 is a diagram illustrating another example of a disposition of the four microphone elements 21, 22, 23, and 24 on a surface of baffle 10A in the shape of a circular cone according to the embodiment. Note that a description of a configuration identical to the configuration illustrated in FIG. 5 will be omitted.

As compared with baffle 10 illustrated in FIG. 5, baffle 10A illustrated in FIG. 6 has a large base region on which no microphone element is disposed. More specifically, the surface of baffle 10A includes (i) the upper part which is a region on which the two or more microphone elements are disposed, and (ii) the lower part which is a base region on which the two or more microphone elements are not disposed. In side views shown in the example illustrated in FIG. 6, the four microphone elements 21, 22, 23, and 24 are disposed at locations on the surface of about at most one third in distance from the vertex to the bottom face of baffle 10A. The disposition of the four microphone elements 21, 22, 23, and 24 is the same as the disposition described in FIG. 5. For this reason, the base region on which the four microphone elements 21, 22, 23, and 24 are not disposed is large, as compared with FIG. 5. With this, as compared with FIG. 5, it is possible to further reduce the extent of a dip in the reference directional pattern which will be described later.

Note that the shape of baffle 10 is not limited to a circular cone. Baffle 10 may be in the shape of a cylinder or a hemisphere. More specifically, the shape of baffle 10 may be a cylinder. In this case, on the surface of baffle 10, one of the two or more microphone elements is to be disposed at the center of the upper surface of the cylinder, and baffle 10 is to be disposed such that the center is oriented toward the front toward which the two or more microphone elements face. In addition, the shape of baffle 10 may be a hemisphere. In this case, on the surface of baffle 10, one of the two or more microphone elements is disposed at the vertex which is a point furthest from the bottom face among points on the hemisphere, and baffle 10 is to be disposed such that the vertex is oriented toward the front toward which the two or more microphone elements face.

[Directionality Synthesizer 30]

Directionality synthesizer 30 produces a directionality synthesized signal by performing directionality synthesis on output signals outputted by the two or more microphone elements. More specifically, directionality synthesizer 30 performs directionality synthesis on output signals outputted by the two or more microphone elements to produce (i) a directionality synthesized signal having sensitivity in the frontal direction in which the two or more microphone elements face, and (ii) a directionality synthesized signal having a blind spot in sensitivity in the frontal direction.

As illustrated in FIG. 1 and FIG. 2, directionality synthesizer 30 according to the embodiment includes first directionality synthesizer 301 and second directionality synthesizer 302.

First directionality synthesizer 301 performs directionality synthesis by processing output signals outputted by the two or more microphone elements to produce a directionality synthesized signal having sensitivity in the frontal direction in which the two or more microphone elements face. Here, the frontal direction is also called a target sound direction. The directionality synthesized signal produced by first directionality synthesizer 301 can also be called an acoustic signal having sensitivity in the target sound direction.

For example, although not illustrated, first directionality synthesizer 301 includes a signal delayer that delays a signal, and a signal subtractor that performs, on a signal, subtraction, or in other words, pressure-gradient directionality synthesis. In the example illustrated in FIG. 1, first directionality synthesizer 301 outputs a directionality synthesized signal which is obtained by the signal subtractor subtracting, from an output signal outputted by microphone element 21, an output signal outputted by microphone element 22 which has been delayed for delay time $\tau$ by the signal delayer, for example.

As such, first directionality synthesizer 301 uses an output signal outputted by microphone element 21 and an output signal outputted by microphone element 22 to produce a directionality synthesized signal which has high sensitivity in the frontal direction and on which the pressure-gradient directionality synthesis is performed.

Second directionality synthesizer 302 performs directionality synthesis by processing output signals outputted by the two or more microphone elements to produce a directionality synthesized signal having a blind spot in sensitivity in the frontal direction in which the two or more microphone elements face. Here, the directionality synthesized signal produced by second directionality synthesizer 302 can also be called an acoustic signal having a blind spot in sensitivity in the target sound direction.

For example, although not illustrated, second directionality synthesizer 302 includes a signal delayer that delays a signal, and a signal subtractor that performs, on a signal, subtraction, or in other words, pressure-gradient directionality synthesis. In the example illustrated in FIG. 1, second directionality synthesizer 302 outputs a directionality synthesized signal obtained by the signal subtractor subtracting, from an output signal outputted by microphone element 22, an output signal outputted by microphone element 21 which has been delayed for delay time τ by the signal delayer, for example.

As such, second directionality synthesizer 302 uses an output signal outputted by microphone element 21 and an output signal outputted by microphone element 22 to produce a directionality synthesized signal which has a blind spot in sensitivity in the frontal direction and on which the pressure-gradient directionality synthesis is performed.

[Adaptive Beamformer Processor 40]

Adaptive beamformer processor 40 performs adaptive beamformer processing by performing linear processing or nonlinear processing on a directionality synthesized signal outputted from directionality synthesizer 30. Here, an adaptive beamformer is a system that performs signal processing for adaptively producing directionality. For example, when the adaptive beamformer processing is performed in the case where the number of microphone elements is two, an adaptive spatial blind spot can be created in a direction from which noise comes to extract a target sound.

In this embodiment, adaptive beamformer processor 40 performs adaptive beamformer processing on directionality synthesized signals outputted by first directionality synthesizer 301 and second directionality synthesizer 302, as reference signals. With this, it is possible to obtain directional characteristics of a signal that microphone device 100 outputs.

[Advantageous Effects, Etc.]

As has been described above, microphone device 100 according to the embodiment includes baffle 10 and microphone array 20, or in other words, two or more microphone elements which are disposed on the surface of baffle 10. With this, an acoustic wave that travels from the frontal direction is not affected by baffle 10, and directly reaches each microphone element. On the contrary, an acoustic wave that travels from a direction other than the frontal direction is affected by baffle 10. The acoustic wave that travels from a direction other than the frontal direction is reflected off or diffracted by baffle 10, and indirectly reaches each microphone element.

As described above, baffle 10 makes it possible for an acoustic wave traveling from a direction other than the frontal direction from which a sound wave desired to be attenuated travels to indirectly reach each microphone element, and thus a phase difference between the microphone elements is increased and a sound pressure difference between the microphone elements is produced. This results in an improvement in reference directionality, or in other words, directionality having a blind spot in sensitivity in the frontal direction, thereby implementing narrowing of directionality of a directional pattern of a signal on which processing, such as adaptive beamformer processing, is performed, and creating of the directional pattern of the signal in various frequency bands. That is to say, microphone device 100 according to the embodiment can implement narrowing of directionality of a directional pattern and creating of the directional pattern having the narrowed directionality in various frequency bands.

Hereinafter, advantageous effects of microphone device 100 according to the embodiment will be described with reference to a comparative example.

Figure 7A:
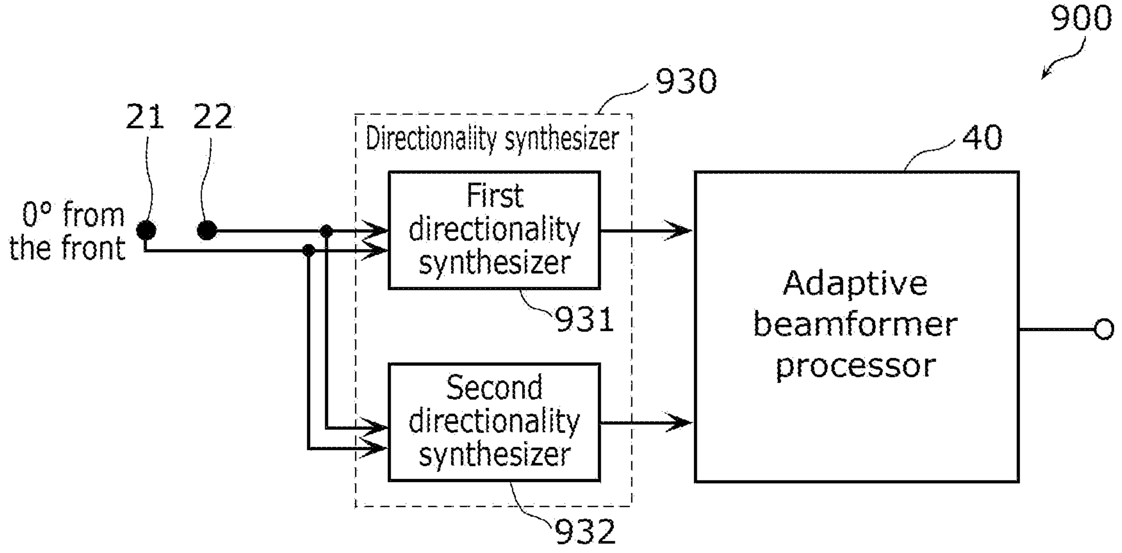
FIG. 7A is a diagram illustrating an example of a configuration of a microphone device according to a comparative example which does not include a baffle.
Figure 7B:
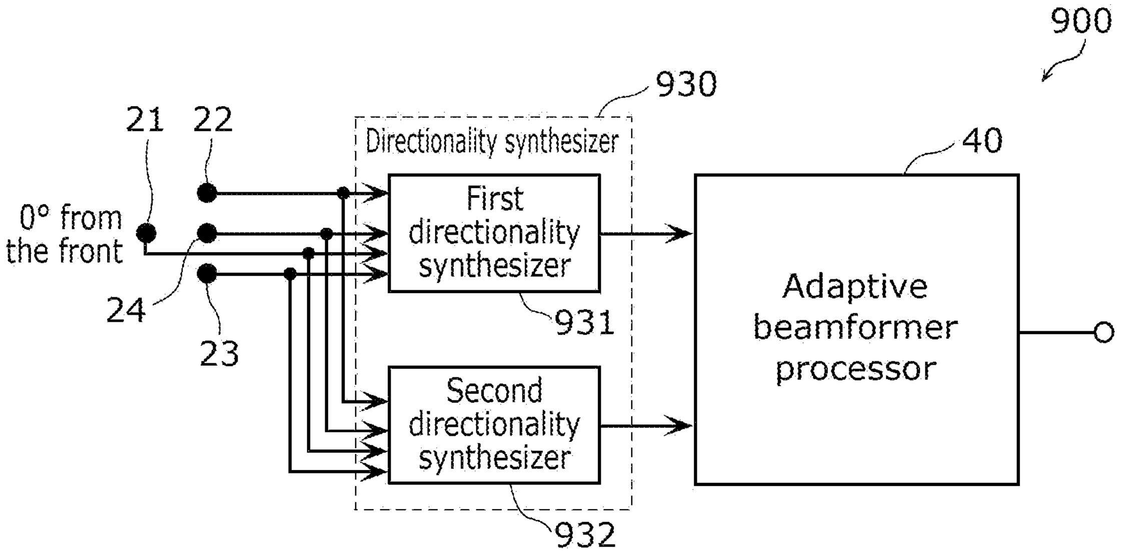
FIG. 7B is a diagram illustrating an example of a configuration of the microphone device according to the comparative example which does not include a baffle.

FIG. 7A and FIG. 7B are diagrams each illustrating an example of a configuration of microphone device 900 according to a comparative example which does not include baffle 10. The same reference signs are given to structural elements identical to the structural elements illustrated in FIG. 1 and FIG. 2, and thus a detailed description will be omitted. The example illustrated in FIG. 7A shows microphone device 900 that includes two microphone elements 21 and 22. The example illustrated in FIG. 7B shows microphone device 900 that includes four microphone elements 21, 22, 23, and 24.

In the comparative example, the two microphone elements 21 and 22 or the four microphone elements 21, 22, 23, and 24 are disposed in a free space without a baffle.

As illustrated in FIG. 7A and FIG. 7B, directionality synthesizer 930 includes first directionality synthesizer 931 and second directionality synthesizer 932, and produces a directionality synthesized signal by performing directionality synthesis on output signals outputted by two or more microphone elements. Descriptions of functions performed by first directionality synthesizer 931 and second directionality synthesizer 932 will be omitted since functions performed by first directionality synthesizer 931 and second directionality synthesizer 932 are the same as the functions performed by first directionality synthesizer 301 and second directionality synthesizer 302, which are described with reference to FIG. 1 and FIG. 2.

Whether baffle 10 is included or not is the point of difference between the configuration of microphone device 900 illustrated in FIG. 7A and FIG. 7B and the configuration of microphone device 100 according to the embodiment which is illustrated in FIG. 1 and FIG. 2.

Next, a directional pattern having a blind spot in sensitivity in the frontal direction, or in other words, a reference directional pattern, which is created by microphone device 100 according to the embodiment and by microphone device 900 according to the comparative example will be described.

Figure 8A:
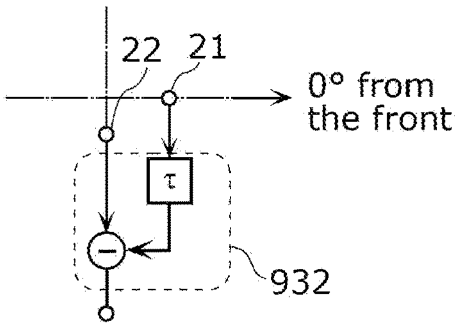
FIG. 8A is a diagram illustrating a configuration according to the comparative example which is provided for performing pressure-gradient directionality synthesis to produce directionality having a blind spot in sensitivity in a frontal direction in which the two microphone elements face.
Figure 8B:
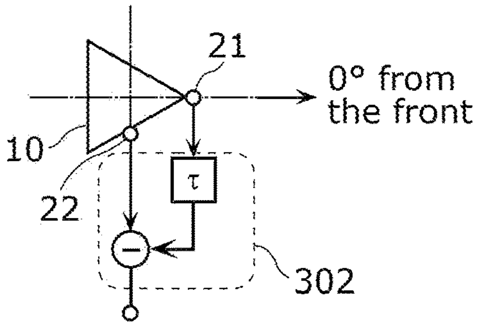
FIG. 8B is a diagram illustrating a configuration according to the embodiment which is provided for performing the pressure-gradient directionality synthesis to produce directionality having a blind spot in sensitivity in a frontal direction in which the two microphone elements disposed on the baffle face.
Figure 8C:
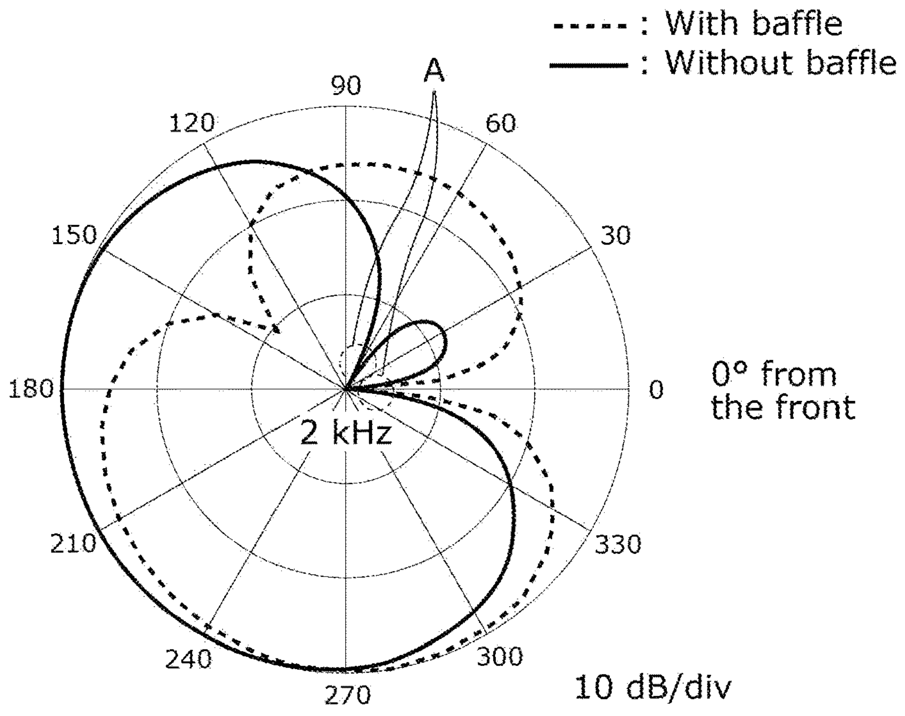
FIG. 8C is a characteristic diagram illustrating reference directional patterns of directionality synthesized signals obtained by performing directionality synthesis by means of the configurations illustrated in FIG. 8A and FIG. 8B.

FIG. 8A is a diagram illustrating a configuration according to the comparative example which is provided for performing pressure-gradient directionality synthesis to produce directionality having a blind spot in sensitivity in the frontal direction in which the two microphone elements 21 and 22 face. FIG. 8B is a diagram illustrating a configuration according to the embodiment which is provided for performing pressure-gradient directionality synthesis to produce directionality having a blind spot in sensitivity in the frontal direction in which the two microphone elements 21 and 22 disposed on baffle 10 face. FIG. 8C is a characteristic diagram illustrating reference directional patterns of directionality synthesized signals obtained by performing directionality synthesis by means of the configurations illustrated in FIG. 8A and FIG. 8B.

FIG. 8A illustrates a configuration including the two microphone elements 21 and 22 disposed in a free space without a baffle and second directionality synthesizer 932, or in other words, the configuration according to the comparative example. On the contrary, FIG. 8B illustrates a configuration including the two microphone elements 21 and 22 disposed on baffle 10 and second directionality synthesizer 302, or in other words, the configuration according to the embodiment. In the configuration according to the comparative example illustrated in FIG. 8A, second directionality synthesizer 932 processes output signals outputted by the two microphone elements 21 and 22 disposed in a free space without a baffle to produce a directionality synthesized signal having a blind spot in sensitivity in the frontal direction. On the contrary, in the configuration according to the embodiment illustrated in FIG. 8B, second directionality synthesizer 302 processes output signals outputted by the two microphone elements 21 and 22 disposed on baffle 10 to produce a directionality synthesized signal having a blind spot in sensitivity in the frontal direction.

The reference directional patterns illustrated in FIG. 8C are calculated according to the following criteria: (i) an interval between microphone element 21 and microphone element 22, which are illustrated in FIG. 8A and FIG. 8B, is 60 mm, (ii) the shape of baffle 10 is a circular cone as illustrated in FIG. 8B, (iii) the diameter of the bottom face of the circular cone is 90 mm, and (iv) the distance between the vertex and the bottom face, or in other words, the length of a generatrix, is 90 mm. In addition, FIG. 8C illustrates, in the form of a polar pattern, the reference directional patterns in the frequency of 2 kHz. In FIG. 8C, the reference directional pattern indicated by a solid line corresponds to a reference directional pattern created by the configuration according to the embodiment which includes baffle 10, and the reference directional pattern indicated by a dotted line corresponds to a reference directional pattern created by the configuration according to the comparative example which does not include baffle 10.

As can be seen from the reference directional patterns illustrated in FIG. 8C, the reference directional pattern created by the configuration according to the comparative example which does not include baffle 10 has nulls at locations indicated by the letter A, and a blind spot in sensitivity is present in a wide angle ranging from 330° to 90°. On the contrary, the reference directional pattern created by the configuration according to the embodiment which includes baffle 10 has no null, and a range of a blind spot in sensitivity in the direction of 0°, or in other words, the frontal direction, is narrow. Note that although a dip is present at about 130° in the reference directional pattern created by the configuration according to the embodiment which includes baffle 10, the extent of a dip can be reduced, as has been described above, by increasing the base region of baffle 10, or by increasing the number of microphone elements to four such that microphone elements, other than the one disposed at the vertex, are disposed without having the vertex as the center of symmetry.

Next, a directional pattern in a frequency band of 2 kHz and directional patterns in frequency bands of other than 2 kHz will be described.

Figure 9A:
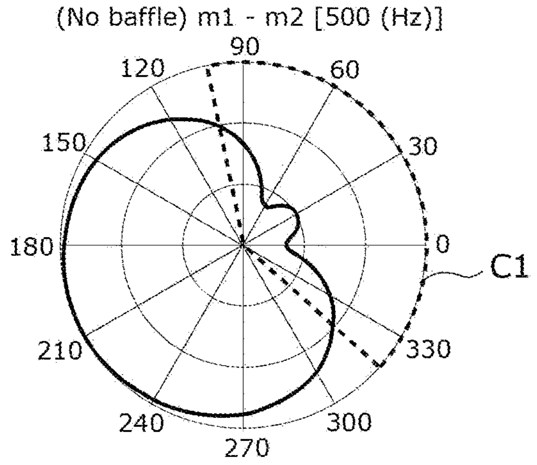
FIG. 9A is a characteristic diagram illustrating, in a frequency band of 500 Hz, a reference directional pattern of a directionality synthesized signal obtained by performing directionality synthesis by means of the configuration according to the comparative example which is illustrated in FIG. 8A.
Figure 9B:
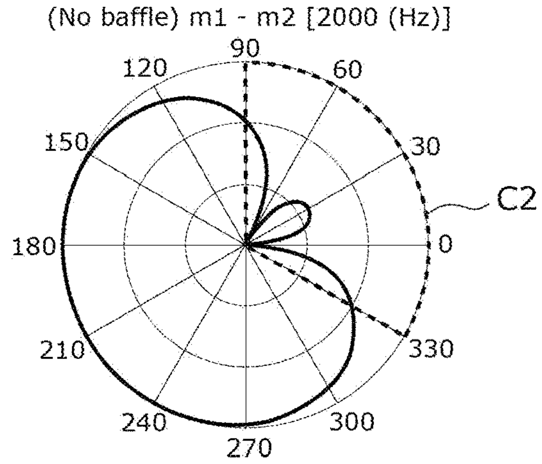
FIG. 9B is a characteristic diagram illustrating, in a frequency band of 2000 Hz, a reference directional pattern of a directionality synthesized signal obtained by performing directionality synthesis by means of the configuration according to the comparative example which is illustrated in FIG. 8A.
Figure 9C:
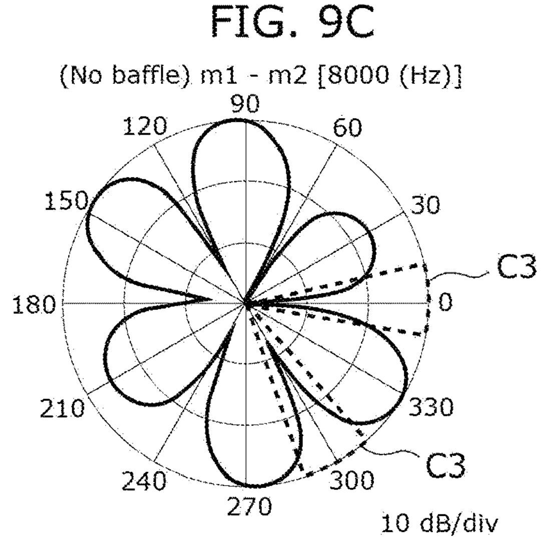
FIG. 9C is a characteristic diagram illustrating, in a frequency band of 8000 Hz, a reference directional pattern of a directionality synthesized signal obtained by performing directionality synthesis by means of the configuration according to the comparative example which is illustrated in FIG. 8A.

FIG. 9A is a characteristic diagram illustrating, in a frequency band of 500 Hz, a reference directional pattern of a directionality synthesized signal obtained by performing directionality synthesis by means of the configuration according to the comparative example which is illustrated in FIG. 8A. FIG. 9B is a characteristic diagram illustrating, in a frequency band of 2000 Hz, a reference directional pattern of a directionality synthesized signal obtained by performing directionality synthesis by means of the configuration according to the comparative example which is illustrated in FIG. 8A. FIG. 9C is a characteristic diagram illustrating, in a frequency band of 8000 Hz, a reference directional pattern of a directionality synthesized signal obtained by performing directionality synthesis by means of the configuration according to the comparative example which is illustrated in FIG. 8A.

As can be seen from FIG. 9A, in the configuration according to the comparative example which does not include baffle 10, blind spot in sensitivity C1 of the reference directional pattern in a low frequency band of 500 Hz is present in a wide angle ranging from 320° to 100°. Similarly, as can be seen from FIG. 9B, in the configuration according to the comparative example which does not include baffle 10, blind spot in sensitivity C2 of the reference directional pattern in a low frequency band of 2000 Hz is also present in a wide angle ranging from 330° to 90°. Furthermore, as can be seen from FIG. 9C, in the configuration according to the comparative example which does not include baffle 10, grating lobes occur, or in other words, blind spots in sensitivity C3 are present in a couple of directions other than 0° from the front, which is the target sound direction, in the reference directional pattern in a high frequency band of 8000 Hz.

Figure 10A:
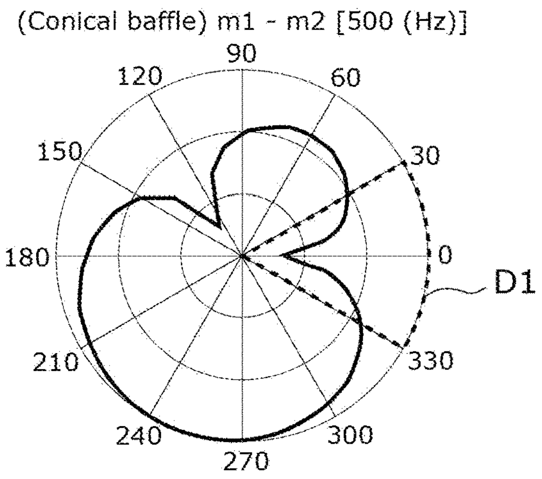
FIG. 10A is a characteristic diagram illustrating, in a frequency band of 500 Hz, a reference directional pattern of a directionality synthesized signal obtained by performing directionality synthesis by means of the configuration according to the embodiment which is illustrated in FIG. 8B.
Figure 10B:
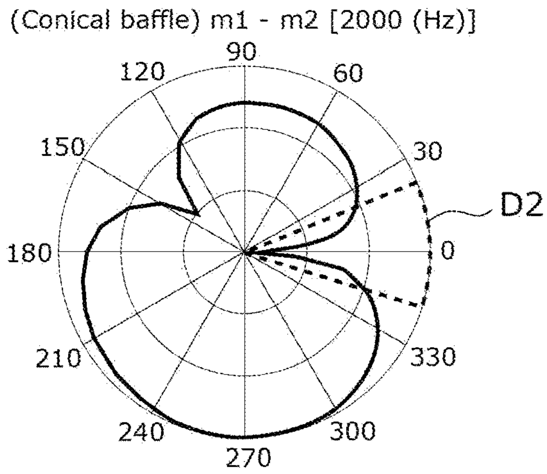
FIG. 10B is a characteristic diagram illustrating, in a frequency band of 2000 Hz, a reference directional pattern of a directionality synthesized signal obtained by performing directionality synthesis by means of the configuration according to the embodiment which is illustrated in FIG. 8B.
Figure 10C:
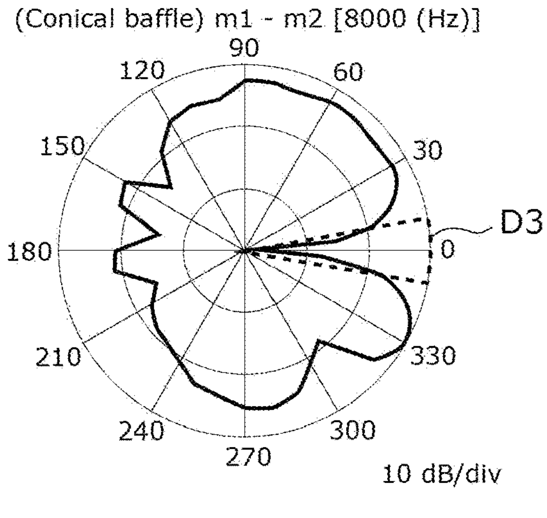
FIG. 10C is a characteristic diagram illustrating, in a frequency band of 8000 Hz, a reference directional pattern of a directionality synthesized signal obtained by performing directionality synthesis by means of the configuration according to the embodiment which is illustrated in FIG. 8B.

FIG. 10A is a characteristic diagram illustrating, in a frequency band of 500 Hz, a reference directional pattern of a directionality synthesized signal obtained by performing directionality synthesis by means of the configuration according to the embodiment which is illustrated in FIG. 8B. FIG. 10B is a characteristic diagram illustrating, in a frequency band of 2000 Hz, a reference directional pattern of a directionality synthesized signal obtained by performing directionality synthesis by means of the configuration according to the embodiment which is illustrated in FIG. 8B. FIG. 10C is a characteristic diagram illustrating, in a frequency band of 8000 Hz, a reference directional pattern of a directionality synthesized signal obtained by performing directionality synthesis by means of the configuration according to the embodiment which is illustrated in FIG. 8B.

As can be seen from FIG. 10A, in the configuration according to the embodiment which includes baffle 10, blind spot in sensitivity D1 of the reference directional pattern in a low frequency band of 500 Hz is present in an angle ranging from 330° to 30°, which is narrow as compared with FIG. 9A. Similarly, as can be seen from FIG. 10B, in the configuration according to the embodiment which includes baffle 10, blind spot in sensitivity D2 of the reference directional pattern in a low frequency band of 2000 Hz is present in an angle ranging from 340° to 20°, which is also narrow as compared with FIG. 9B. Furthermore, as can be seen from FIG. 10C, in the configuration according to the embodiment which includes baffle 10, occurrence of a grating lobe is reduced in the reference directional pattern in a high frequency band of 8000 Hz, as compared with FIG. 9C. Furthermore, a blind spot in sensitivity between grating lobes is not present, and blind spot in sensitivity D3 is present only at 0° from the front, which is the target sound direction.

As has been described above, the configuration according to the embodiment not only enables narrowing of the range of a blind spot in sensitivity of the reference directional pattern in a low frequency band, but also reduces the effect demonstrated by a grating lobe in the high frequency band to enable creating of the reference directional pattern in various frequency bands, or in other words, exceeding of a limit of the high frequency band where the reference directional pattern can be created.

In other words, in the configuration according to the comparative example, an interval between microphone elements determines the limit of processing. However, in the configuration according to the embodiment, it can be said that the inclusion of baffle 10 has removed the limit of processing due to an interval between microphone elements.

As has been described above, the inclusion of baffle 10 and the disposition of microphone elements on the surface of baffle 10 enable microphone device 100 according to the embodiment to implement narrowing of directionality of a directional pattern and creating of the directional pattern having the narrowed directionality in various frequency bands, even if microphone device 100 is downsized by reducing the number of microphone elements. Therefore, microphone device 100 according to the embodiment can implement a directional pattern having uniform sensitivity and sensitivity in a narrow range in a various frequency bands, even if microphone device 100 is downsized.

The foregoing has described microphone device 100 etc. according to one or more aspects of the present disclosure based on the embodiments and the variations, yet the present disclosure is not limited to these embodiments etc. Without departing from the scope of the present disclosure, various modifications which may be conceived by a person skilled in the art, and embodiments achieved by combining elements in different embodiments may be encompassed within the range of the one or more aspects. For example, the present disclosure includes the following cases.

(1) Microphone device 100 described above includes adaptive beamformer processor 40, but microphone device 100 may include, instead of adaptive beamformer processor 40, a sound-source processor that performs sound source separation processing, for example.

(2) Directionality synthesizer 30 and adaptive beamformer processor 40 included in the above-described microphone device 100 may specifically be a computer system including a microprocessor, a read-only memory (ROM), a random-access memory (RAM), a hard disk unit, a display unit, a keyboard, a mouse, etc. A computer program is stored in the RAM or in the hard disk unit. Each of the devices demonstrates its function as a result of the microprocessor operating according to the computer program. Here, the computer program is configured by combining a plurality of instruction codes indicating instructions for the computer for demonstrating a given function.

(3) Some or all of the structural elements included in the above-described directionality synthesizer 30 and adaptive beamformer processor 40 may be configured from a single system large-scale integration (LSI). The system LSI is a super-multifunction LSI manufactured with a plurality of components integrated on a single chip, and specifically is a computer system including a microprocessor, ROM, and RAM, for example. A computer program is stored in the RAM. The system LSI demonstrates its function as a result of the microprocessor operating according to the computer program.

(4) Some or all of the structural elements included in the above-described directionality synthesizer 30 and adaptive beamformer processor 40 may be configured from a standalone module or an IC card detachable from the devices. The IC card and the module are computer systems configured from a microprocessor, ROM, and RAM, for example. The IC card and the module may include the super-multifunction LSI described above. The IC card and the module demonstrate their function as a result of the microprocessor operating according to a computer program. The IC card and the module may be tamperproof.

INDUSTRIAL APPLICABILITY

The present disclosure is useful for a small microphone device used for performing adaptive beamformer processing or voice separation.

The invention claimed is:

1. A microphone device, comprising:

two or more microphone elements for picking up sounds which are disposed in spatially different locations;

a baffle that has a surface on which the two or more microphone elements are disposed, and interferes with, among the sounds, a passage of a sound other than a direct sound that travels from a frontal direction in which the two or more microphone elements face and directly reaches the two or more microphone elements; and a directionality synthesizer that produces a directionality synthesized signal by performing directionality synthesis on output signals outputted by the two or more microphone elements, wherein the baffle is in a shape of a cone, and the two or more microphone elements are disposed at locations on the surface of the baffle such that none of the two or more microphone elements are disposed at a vertex of the cone.

2. The microphone device according to claim 1, wherein the baffle is disposed such that the vertex of the cone is oriented toward a front toward which the two or more microphone elements face.

3. The microphone device according to claim 2, wherein the surface of the baffle includes:

an upper part which is a region on which the two or more microphone elements are disposed; and a lower part which is a base region on which the two or more microphone elements are not disposed.

4. The microphone device according to claim 1, wherein the directionality synthesizer produces, by performing directionality synthesis on the output signals outputted by the two or more microphone elements:

a directionality synthesized signal having sensitivity in the frontal direction; and a directionality synthesized signal having a blind spot in sensitivity in the frontal direction.

5. The microphone device according to claim 1, wherein the two or more microphone elements include at least two and at most 16 microphone elements.

6. A microphone device, comprising:

two or more microphone elements for picking up sounds which are disposed in spatially different locations;

a baffle that has a surface on which the two or more microphone elements are disposed, and interferes with, among the sounds, a passage of a sound other than a direct sound that travels from a frontal direction in which the two or more microphone elements face and directly reaches the two or more microphone elements; and a directionality synthesizer that produces a directionality synthesized signal by performing directionality synthesis on output signals outputted by the two or more microphone elements, wherein the baffle is in a shape of a cone, and all of the two or more microphone elements are disposed at locations on the surface of the baffle in a region that extends from a vertex of the cone to no more than approximately one third in distance from the vertex of the cone to a bottom surface of the cone.

7. The microphone device according to claim 6, wherein one microphone element among the two or more microphone elements is disposed at the vertex of the cone, and the baffle is disposed such that the vertex of the cone is oriented toward a front toward which the two or more microphone elements face.

* * * * *